Patented Aug. 19, 1941

2,252,917

UNITED STATES PATENT OFFICE 2,252,917

QUICK DRYING PRINTING INK AND METHOD OF PREPARATION

Joseph G. Curado, Rutherford, N. J., assignor to General Printing Ink Corporation, New York, N. Y., a corporation of Delaware No Drawing. Application March 21, 1938, Serial No. 197,308

14 Claims. (Cl. 260—19)

This invention relates to improved, quick drying printing inks and particularly to a method of preparing printing inks suitable for printing on metals or other substantially non-absorbent materials which permit practically no penetration of the ink.

An object of the invention is to produce an ink for printing on metals such as tin or tin plate or on similar non-absorbent surfaces, which will dry in a much shorter time on baking than do the commonly used tin printing inks.

A further object is to produce an ink for printing on metallic or similar surfaces, which ink not only dries in a very short time, but also results in a very flexible, adherent, hard and relatively scratch-proof film on baking.

A still further object is to produce an ink for printing on metals which will be so hard and resistant to abrasion, that no top coating of varnish or similar material will be required to protect the ink film from scratching or marring during the fabrication and use of the printed article.

These objects are accomplished by combining certain heat reactive oils and resins in a two-stage varnishing making process in such a way that the major portion of the polymerization or "drying" takes place during the cooking rather than after application of the ink to the printing surface.

Prior art

The art of decorating metals, particularly tin and tin plate, is practiced widely as a step in the production of cans, boxes, containers, closures, display signs and other products. Various decorative designs or lettering are often printed on metal sheets using transparent coatings or colored inks as the decorative medium.

Metal printing is usually done by the offset printing process, and as ordinarily used, generally employs three cylinders in contact with one another. The upper, or plate cylinder, as the name implies, carries the printing plate and runs in contact with the inking mechanism. The center or blanket cylinder runs in contact with the plate cylinder and carries a rubber blanket which receives ink from the plate cylinder, and "offsets" it to the sheet. The third, or impression cylinder, holds the sheet of metal against the blanket cylinder while the impression is being transferred.

As the metal sheets are impervious to the ink, the latter cannot "dry" by penetration or absorption into the printed medium. The ink, therefore, remains entirely upon the surface and consequently cannot be touched without smudging until it has practically completely dried. This drying is customarily accomplished by stacking the inked sheets in racks and baking in a heated oven either continuously or in batches. The baked sheets are then varnished to impart gloss and protection to the ink, and again baked to set the varnish. The decorated sheets are then cut and formed into the desired shapes, such as cans, boxes, etc., with suitable cutting and forming tools.

Inks which are to be used for metal decorating should be resistant to darkening or color change during the baking operation; they should have good adhesion to the metal surface, and should remain flexible after baking to permit the drastic deformations incident to the shaping and fabricating operations. They should dry as quickly as possible under the conditions of the ovens, and should not react with the subsequent varnish coating.

The balancing of an ink composition to the conditions of the ovens requires considerable skill and knowledge of materials and their reactions upon heating to various temperatures and for various lengths of time.

According to Wolfe (Manufacture of Printing and Lithographic Inks, N. Y. McNair Dorland Co., 1933), p. 202–204, tin printing inks have usually consisted of pigments ground in lithographic or transparent varnish (linseed oil) together with a small amount of drier. In general, baking times range from 15 to 25 minutes at temperatures between 200° and 280° F.

As modern production methods tend to increasing speeds, the necessity of baking for the relatively long time of 15 to 25 minutes slows down the auxiliary processes to the capacity of the ovens in the case of the batch process, or necessitates a tremendous amount of tunnel drying equipment, occupying a large floor space area in the case of a continuous, conveyor drying process, where the speed of the conveyor through the tunnel is high. Naturally, the shorter the drying tunnel, the slower the speed with which it must be traversed by the printed sheet to provide any desired predetermined baking time. If the oven is longer, the conveyor can, of course, be speeded up a proportional amount for a given baking time.

The tendency and urge toward higher speeds, existing in all commercial operations, is faced here with several theoretical alternatives. Either a higher temperature could be maintained; a longer drying tunnel could be provided for the same baking conditions, thus allowing increased speed of the conveyor; or a faster drying ink could be used.

Excessively high temperatures, however, are not only costly to maintain, but have been found to be very detrimental to the coatings, which discolor and become embrittled on exposure to high temperatures, whereby the beauty of the printed effects is impaired, and the flexibility so necessary in subsequent forming operations, is destroyed.

Many plants have installed longer drying tunnels, but these are not only very costly to install and operate, but require a great deal of floor space, more than is often available in existing plants, so that their use sometimes entails a complete redesigning of the plant or the building of a new one.

The desirability of an ink which would dry faster under existing or simplified conditions has long been recognized, but several factors have militated against its development.

Film forming materials dissolved in volatile solvents are unsatisfactory for this type of printing, as they dry too rapidly and set on the inking rolls before they reach the work. Moreover, cellulose derivatives, which usually form the basis of such lacquers, have notoriously poor adhesion to metals such as tin and tin plate, unless supplemented by resins in such proportions as to produce a brittle film. Such coatings also lack the flexibility necessary for the die forming operations to which the decorated metal must be subjected. Simple "spirit varnishes," that is, solutions of resins in solvents, usually alcohol, while generally excellent in adherence, are objectionable for the same reasons as the lacquers, in drying too rapidly on the printing rolls, and in producing brittle films which will not stand fabrication.

As pointed out above, the presently used oil inks meet as many of the conditions for satisfactory metal printing inks as any so far developed. Such inks, however, are very slow drying, even at the elevated temperatures of the baking ovens, and result in films which are so soft and subject to marring and abrasion that a protective coating of varnish or the like must be applied to prevent scratching or marring during die formation of the product and in subsequent use. Moreover, the drying reaction, (readily a combination of oxidation and polymerization), as it takes place in the oven is not a simple one in which the film becomes progressively harder as the heating proceeds. There appears to be an initial skinning over of the film, and then, just before the film becomes hard enough to handle or touch, it passes through a soft or "tender" stage, during which it can be easily marked or marred. The reason for this behavior is not completely understood, but it is a stage quite universally observed in the polymerization of oils and certain other polymerizable materials.

Accordingly, if the metal sheet is removed from the baking oven a few moments too soon, the coating is liable to be in the soft stage and very sensitive to marring. Thus there is always present a critical minimum of drying time for a given drying temperature below which it has been impossible to go.

I have now discovered that by properly selecting my varnish ingredients, and by carrying out a major proportion of the polymerization of the varnish during its preparation, i. e., before application to the work, the troublesome "tender" or soft stage can be passed in the kettle, and the resulting ink be made to dry in a relatively much shorter time at the same temperature in the oven.

Such a procedure has previously been thought impossible, as hardening or gelling took place in the ink cans whenever polymerization had been made to proceed too far in the varnish kettle.

My results are accomplished by cooking my varnish to the point of incipient gelation, then adding additional materials including solvents, and further cooking to the desired tack or body.

In carrying out my invention I select my varnish ingredients from among the drying and semi-drying or non-drying oils commonly used in ink making, and combine these oils with resins as in varnish making practice. However, I prefer to select my resins from the class of oil soluble synthetic resin materials such as those of the heat reactive type. Examples of these are the heat reactive phenol resins which have been modified with other materials such as alkyl derivatives, natural resins, oils, oil acids and the like, although other heat reactive resins may also work satisfactorily. One of the most satisfactory resins for my purpose is one of the type of alkyl substituted phenol-formaldehyde condensation product modified with Chinese wood oil (tung oil) and particularly the phenyl substituted product. In referring to resins "modified" with various constituents, I use the term "modified" in the sense commonly used in resin manufacture to mean that all the ingredients, including the modifier are combined during resinification, so that a homogeneous compound or mixture results. (See "The Chemistry of Synthetic Resins," by Carleton Ellis, Reinhold Pub. Co., 1935, chapters 19 and 20, entitled "Modified Phenolaldehyde Resins.") After these ingredients, together with solvents and plasticizers have been compounded according to my improved method, the finished varnish can be used alone or with additional oil and other ingredients as a grinding medium for the various pigments, lakes and toners commonly used in metal decorating inks.

An example of my varnish base is given below in parts by weight.

EXAMPLE I

| | |
|---|---|
| Phenyl substituted phenol-formaldehyde resin modified with tung oil (Bakelite No. 302 resin) | 1140 |
| Raw tung oil | 490 |
| Blown castor oil | 60 |
| Benzyl alcohol | 275 |
| Dimethyl phthalate | 390 |
| | 2355 |

In making up this varnish, the resin and tung oil were heated to 170° C. in ½ hour. The heat was then shut off, but the temperature continued to rise. When the mass had attained a temperature of 200° C., gentle heat was again applied for about ½ hour, and then the temperature was raised quickly to 240° C. and held at this temperature until the mass had attained its maximum body short of gelation. The remaining ingredients were then added, and the temperature was raised to 210° C. and held at this point under refluxing conditions until the varnish had reached the desired consistency or body, which in this case was about 3 hours.

After application to metal and baking at 200–220° F. for three minutes, this varnish was hard and tack free, and after 24 hours had aged sufficiently to permit die forming and fabrication of the decorated metal.

Other modified phenol resins besides the one given in the example can be used, provided they are of the heat reactive type, which tend to "body" or form a gel on heating. These resins have the general characteristics of the resins described in U. S. Patent 2,073,229, to Shuey, although the patent refers more specifically to alkyl substituted phenol-formaldehyde resins prepared in combination with linseed oil, whereas the Chinese wood oil modification is preferred in my ink. The linseed oil modified resin can be used, but causes the ink to be slower drying than the tung oil or oiticica or perilla oil modified resin.

Any drying oils which tend to gel on heating may be used, such as tung oil (Chinese wood oil), oiticica oil, perilla oil, certain of the modified castor oils such as that known in the trade as Isolene, and also linseed oil, although the latter requires a somewhat longer time to set than do the other oils mentioned, and moreover produces softer films than inks made with other oils.

In place of castor oil, I may use any of the semi-drying or non-drying oils commonly used in varnish making.

Any of the usual high boiling solvents may be used, but should be selected according to their ability to dissolve the gels formed in the polymerization of the resin-oil complexes, as well as for their low solvent action on the rubber printing rolls and blankets. The glycol derivatives, while they produce satisfactory inks, are undesirable because they have a somewhat deleterious effect on rubber. Aside from their action on the rubber rolls and blankets of the printing press, such solvents as the glycol derivatives mentioned above, i. e., ethers of mono- or di-ethylene glycol, tetralin, hexalin, cyclohexanone and the like would be satisfactory, and can be used where roll replacement is not an important factor. Benzyl alcohol, on the other hand, has no appreciable solvent action on the rubber rolls, and is an excellent solvent for the complex gels formed in the cooking. It is therefore specified as the preferred solvent. Plasticizers such as dimethyl phthalate and diamyl phthalate, (which are also solvents) are preferred as they have very little harmful effect on the printing rolls. Dibutyl phthalate tends to swell rubber very slightly, but is otherwise a satisfactory plasticizer, as are also triphenyl phosphate, tricresyl phosphate, castor oil, triacetin and the like.

The cooking conditions will vary somewhat, depending on the heat reactive ingredients used in the first stage. In this stage the reaction is exothermic, giving off heat as it proceeds. The rise in temperature to the desired maximum, i. e., to the point of incipient gelation, should be steady. Therefore, the heat should be shut off at a predetermined point before the maximum is reached, allowing the heat of reaction to carry the temperature rise further. The heat of reaction will not be sufficient to carry the cook to completion, and additional heat must be applied to raise the temperature to that at which maximum body develops. This temperature may be in the neighborhood of 238–242° C., and is held for about 15 minutes to ½ hour. The end point of the cook is indicated when a cooled pill of the varnish refuses to elongate to a thread or string more than 3 inches in length, and breaks off in a rubbery manner.

Solvents and plasticizers are added at this point, and the mass is heated to about 190–200° C., under refluxing conditions until the desired body has been reached, generally after about 2½ to 3 hours. Immediately after addition of the solvent, the varnish presents a rather gelatinous and stringy appearance. After about 1½ to 2 hours of cooking, most of the lumps have disappeared, and the varnish begins to be shorter and less tacky. After about a half hour more, the varnish compares in "body," "length," and "tack" with standard varnishes of this type, and is ready for application as a clear ink, or for incorporation of pigments in the usual way, with or without the addition of additional oils, waxes, etc. The point at which the solvents are added is a critical one, as the addition must be made at the moment when the varnish has reached its maximum body but before the gels have set.

Any desired color can be compounded from this type of base, with the modifications necessary to adapt it to the different properties of the different pigments and colors. Such modifications are customary and are well recognized in the ink making industry.

Examples of different colored inks according to my invention are given below in parts by weight.

EXAMPLE II.—*Black ink*

| | |
|---|---|
| Varnish of Example I | 60 |
| Blown tung oil | 14 |
| Milori blue | 4 |
| Lamp black | 24 |
| Drier | 3 |
| Carnauba wax (50% solution in benzyl alcohol) | 3 |
| | 110 |

EXAMPLE III.—*Green ink*

| | |
|---|---|
| Varnish of Example I | 24 |
| Blown tung oil | 10 |
| Chrome yellow, lemon | 11.5 |
| Chrome yellow, medium | 16 |
| Milori blue | 12.5 |
| Alumina hydrate | 6 |
| Titanium dioxide | 28 |
| | 108 |

EXAMPLE IV.—*Blue ink*

| | |
|---|---|
| Varnish of Example I | 58 |
| Blown tung oil | 24 |
| Tungstate purple toner | 48 |
| Milori blue | 9.5 |
| Ultramarine blue | 17 |
| Lithol red (dry) | 1 |
| | 157.5 |

EXAMPLE V.—*Red ink*

| | |
|---|---|
| Varnish of Example I | 26 |
| Blown tung oil | 10.5 |
| Litholrubine toner | 6.2 |
| Cadmium red | 36.09 |
| Cadmium yellow | 12.53 |
| Alumina hydrate | 8.73 |
| Dry magnesia | 3.44 |
| | 103.49 |

Another type of varnish base is given below:

EXAMPLE VI.—*Varnish base*

| | |
|---|---|
| Phenol-formaldehyde resin modified with natural resin (Amberol) | 150 |
| Raw tung oil | 80 |

This mixture was heated to 560° F. in ½ hour, and then the following were added:

| | |
|---|---|
| Raw tung oil | 370 |
| Linseed oil #0 | 60 |

The mixture was then brought to 500° F. in 20 minutes and held for ½ hour, i. e., to the point of gelation. Then was added:

| | |
|---|---|
| Benzyl alcohol | 60 |
| | 720 |

EXAMPLE VII.—*Black ink*

| | |
|---|---|
| Varnish of Example VI | 60 |
| Carbon black | 23 |
| Iron blue | 8 |
| Drier | 5 |
| Carnauba wax (30% solution in benzyl alcohol) | 4 |
| Benzyl alcohol | 6 |
| | 106 |

When applied to tin plate and baked, these inks dry in approximately 3-5 minutes at a temperature of about 200-220° F., depending on the type and proportion of solvent used. While the usual tin printing inks require an ageing period of 7-14 days before they can be cut or formed on the dies or other forming tools, the inks of my invention are hard enough to withstand the forming operations in only 24 hours.

These inks dry to a very hard surface which is glossy and relatively scratch-proof, so that a top coat of protective varnish is not necessary to protect the ink from marring, although, of course, such a varnish may be applied if desired.

My new inks exhibit excellent adhesion to the metal surfaces to which they are applied. This is one of the most important characteristics of this type of ink, as it must withstand shaping and forming operations without chipping or flaking off or loosening its hold on the metal base.

While the preferred embodiments of my invention have been described in some detail, it should be understood that the invention is not to be limited to the precise details described, but may be carried out in other ways.

I claim as my invention:

1. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with drying oil to the point of incipient gelation, adding a solvent; then continuing the polymerization but preventing gelation which would otherwise occur, by further heating in the presence of said solvent for about two and one-half to three hours, at a temperature of about 190° to 210° C., and thereafter cooling and grinding with a pigment, whereby the resulting ink, when printed on metal, will dry at a temperature of 200° to 220° F. in from three to five minutes.

2. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with drying oil to the point of incipient gelation, adding a solvent and a plasticizer; then continuing the polymerization but preventing gelation which would otherwise occur, by further heating in the presence of said solvent and of said plasticizer for about two and one half to three hours, at a temperature of about 190° to 210° C., and thereafter cooling and grinding with a pigment, whereby the resulting ink, when printed on metal, will dry at a temperature of 200° to 220° F. in from three to five minutes.

3. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with tung oil to the point of incipient gelation, adding a solvent; then continuing the polymerization but preventing gelation which would otherwise occur, by further heating in the presence of said solvent for about two and one half to three hours, at a temperature of about 190° to 210° C., and thereafter cooling and grinding with a pigment, whereby the resulting ink, when printed on metal, will dry at a temperature of 200° to 220° F. in from three to five minutes.

4. The method of preparing a printing ink which comprises heating a phenyl substituted phenol-formaldehyde-drying-oil-modified resin, with a drying oil to the point of incipient gelation, adding a solvent and a plasticizer, continuing the polymerization but preventing gelation which would otherwise occur, by further heating in the presence of the solvent and the plasticizer, for about two and one half to three hours at a temperature of about 190° to 210° C., and thereafter cooling and grinding with a pigment, whereby the resulting ink, when printed on metal, will dry at a temperature of 200° to 220° F. in from three to five minutes.

5. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with drying oil to the point of incipient gelation, adding benzyl alcohol; then continuing the polymerization but preventing gelation which would otherwise occur, by further heating in the presence of said benzyl alcohol for about two and one-half to three hours, at a temperature of about 190° to 210° C., and thereafter cooling and grinding with a pigment, whereby the resulting ink, when printed on metal, will dry at a temperature of 200 to 220° F. in from three to five minutes.

6. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with drying oil to the point of incipient gelation, adding cyclohexanone; then continuing the polymerization but preventing gelation which would otherwise occur, by further heating in the presence of said cyclohexanone for about two and one-half to three hours, at a temperature of about 190° to 210° C., and thereafter cooling and grinding with a pigment, whereby the resulting ink, when printed on metal, will dry at a temperature of 200 to 220° F. in from three to five minutes.

7. The method of preparing a printing ink which comprises heating a resin selected from the group consisting of a phenyl substituted phenol-formaldehyde-drying-oil-modified resin, an alkyl substituted phenol-formaldehyde-drying-oil-modified resin, a phenol-formaldehyde natural resin condensation product; with drying oil to the point of incipient gelation, adding hexalin; then continuing the polymerization but preventing gelation which would otherwise occur, by further heating in the presence of said hexalin for about two and one-half to three hours, at a temperature of about 190° to 210° C., and thereafter cooling and grinding with a pigment, whereby the resulting ink, when printed on metal, will dry at a temperature of 200 to 220° F. in from three to five minutes.

8. The method of preparing a printing ink which comprises heating a phenyl substituted phenol-formaldehyde-drying-oil-modified resin, with tung oil to the point of incipient gelation, adding benzyl alcohol and a plasticizer, continuing the polymerization but preventing gelation which would otherwise occur, by further heating in the presence of the benzyl alcohol and the plasticizer, for about two and one-half to three hours at a temperature of about 190° to 210° C., and thereafter cooling and grinding with a pigment, whereby the resulting ink, when printed on metal, will dry in from three to five minutes.

9. A quick drying printing ink for printing on metal made in accordance with the process of claim 1.

10. A quick drying printing ink for printing on metal made in accordance with the process of claim 2.

11. A quick drying printing ink for printing on metal made in accordance with the process of claim 3.

12. A quick drying printing ink for printing on metal made in accordance with the process of claim 4.

13. A quick drying printing ink for printing on metal made in accordance with the process of claim 5.

14. A quick drying printing ink for printing on metal made in accordance with the process of claim 8.

JOSEPH G. CURADO.